US008493392B2

(12) United States Patent
Honme

(10) Patent No.: US 8,493,392 B2
(45) Date of Patent: Jul. 23, 2013

(54) IMAGE DISPLAY DEVICE

(75) Inventor: Mitsuhiro Honme, Hamamatsu (JP)

(73) Assignee: Yamaha Corporation (JP)

( * ) Notice: Subject to any disclaimer, the term of this patent is extended or adjusted under 35 U.S.C. 154(b) by 497 days.

(21) Appl. No.: 12/821,680

(22) Filed: Jun. 23, 2010

(65) Prior Publication Data

US 2010/0328318 A1 Dec. 30, 2010

(30) Foreign Application Priority Data

Jun. 29, 2009 (JP) ................................ 2009-153875
Jun. 29, 2009 (JP) ................................ 2009-153879

(51) Int. Cl.
*G06T 13/00* (2011.01)

(52) U.S. Cl.
USPC ........................................................ 345/473

(58) Field of Classification Search
None
See application file for complete search history.

(56) References Cited

U.S. PATENT DOCUMENTS 5,579,028 A * 11/1996 Takeya .......................... 345/641
2009/0066641 A1 * 3/2009 Mahajan et al. .............. 345/156

FOREIGN PATENT DOCUMENTS

JP 2000-035781 A 2/2000

* cited by examiner

*Primary Examiner* — Kee M Tung
*Assistant Examiner* — Haixia Du
(74) *Attorney, Agent, or Firm* — Rossi, Kimms & McDowell LLP

(57) ABSTRACT

An image display device is constructed by a display memory, a sprite attribute table, a sprite rendering processor and an animation execution engine. The display memory stores image data to be displayed on a display. The sprite attribute table stores attribute data representing a display attribute of a sprite which is a component of the image data. The sprite rendering processor executes a drawing process for reflecting image data of the sprite to the image data stored in the display memory according to the attribute data stored in the sprite attribute table. The animation execution engine reads an animation execution program including both attribute data to be transferred and a table write command of the attribute data from an external memory, and executes the animation execution program to transfer the attribute data to the sprite attribute table according to the table write command.

4 Claims, 6 Drawing Sheets

FIG. 2

START COMMAND

| | |
|---|---|
| OPCODE | S |
| OPERAND | NUMBER OF LOOPS |

END COMMAND

| | |
|---|---|
| OPCODE | E |
| OPERAND | ABSENT |

LOOP COMMAND

| | |
|---|---|
| OPCODE | L |
| OPERAND | RETURN ADDRESS |
| | REPEAT MODE |

INTERVAL COMMAND

| | |
|---|---|
| OPCODE | I |
| OPERAND | NUMBER OF VERTICAL BLANKS FOR WAITING |

FLIP COMMAND

| | |
|---|---|
| OPCODE | F |
| OPERAND | FLIP MODE VALUE |
| | LYSAM |
| | LYEAM |

TABLE WRITE COMMAND

| | |
|---|---|
| OPCODE | T |
| OPERAND | NUMBER OF BYTES FOR WRITING |
| | WRITE START ADDRESS |
| | DATA FOR WRITING |

TABLE CYCLE WRITE COMMAND

| | |
|---|---|
| OPCODE | C |
| OPERAND | NUMBER OF BYTES FOR REPETITION |
| | WRITE START ADDRESS |
| | WRITE END ADDRESS |
| | DATA FOR WRITING |

PALETTE WRITE COMMAND

| | |
|---|---|
| OPCODE | P |
| OPERAND | NUMBER OF BYTES FOR WRITING |
| | WRITE START ADDRESS |
| | DATA FOR WRITING |

REGISTER WRITE COMMAND

| | |
|---|---|
| OPCODE | R |
| OPERAND | NUMBER OF BYTES FOR WRITING |
| | WRITE START ADDRESS |
| | DATA FOR WRITING |

IMAGE DISPLAY DEVICE

BACKGROUND OF THE INVENTION

1. Technical Field of the Invention

The present invention relates to an image display device suitable for an information display apparatus or the like.

2. Description of the Related Art

A variety of image display devices include a sprite attribute table, which stores attribute data representing display attributes such as a display position, a magnification ratio, or the like of a sprite to be displayed, and can display an image of the sprite on a display according to the attribute data stored in the sprite attribute table. Such image display devices have been suggested, for example, in Japanese Patent Application Publication No. 2000-35781.

In some image display devices, an animation is displayed on a display by changing the display position of the sprite. FIG. 5 is a block diagram illustrating a configuration of part of a conventional image display device 10 which includes such an animation display function.

In FIG. 5, a display memory 3 is a memory that stores image data to be displayed on a display (not shown). The display memory 3 may be a frame memory that stores image data in units of frames (i.e., in units of screens). The display memory 3 may also be a line memory that stores image data in units of lines (i.e., in units of horizontal scan lines). Sprite attribute tables 1A and 1B are a table that stores attribute data representing display attributes of a sprite as described above. The sprite attribute tables 1A and 1B are alternately selected as a sprite attribute table for drawing and a sprite attribute table for update, respectively. A sprite rendering processor 2 performs a drawing process, which reflects an image of the sprite to a display screen of the display, by reading pattern data of the sprite stored in a pattern memory (not shown) and storing the read pattern data in the display memory 3. Here, with reference to one of the sprite attribute tables 1A and 1B which is selected as a table for drawing, the sprite rendering processor 2 performs, for example, a process for determining the address of the pattern data of the sprite in the display memory 3 to allow the sprite to be displayed at a display position represented by the attribute data.

In the case where an animation is displayed on the image display device 10, a CPU which controls the image display device 10 repeats a process which rewrites (or updates) attribute data in one of the sprite attribute tables 1A and 1B, which is selected as a table for update and switches the sprite attribute table for update to a sprite attribute table for drawing.

FIG. 6 is a time chart illustrating an example of the operation of such animation display. In the example shown in FIG. 6, "VSYNC_N" is a vertical synchronous signal provided to the display, and a period from a falling edge of the vertical synchronous signal VSYNC_N to a next falling edge thereof is one vertical scan period (i.e., one frame) for displaying an image corresponding to one frame. The display memory 3 is a frame memory which can store image data of two frames.

In the example shown in FIG. 6, in frame 1, the sprite attribute table 1A is selected as a table for update and the sprite attribute table 1B is selected as a table for drawing. Thus, the CPU writes attribute data 1 in the sprite attribute table 1A. Then, in frame 2, the sprite attribute table 1A is selected as a table for drawing and the sprite attribute table 1B is selected as a table for update. Thus, the sprite rendering processor 2 performs a drawing process that stores pattern data of the sprite in the display memory 3 according to the attribute data 1 stored in the sprite attribute table 1A for drawing. On the other hand, the CPU writes attribute data 2 to the sprite attribute table 1B for update.

Then, in frame 3, the sprite attribute table 1A is selected as a table for update and the sprite attribute table 1B is selected as a table for drawing. Thus, the sprite rendering processor 2 performs a drawing process that stores pattern data of the sprite in the display memory 3 according to the attribute data 2 stored in the sprite attribute table 1B for drawing. On the other hand, the CPU writes attribute data 3 to the sprite attribute table 1A for update. In parallel with these operations, in frame 3, image data that is stored in the display memory 3 in frame 2, i.e., pattern data of the sprite drawn according to the attribute data 1, is read from the display memory 3 and displayed on the display.

Then, in frame 4, the sprite attribute table 1A is selected as a table for drawing and the sprite attribute table 1B is selected as a table for update. Thus, the sprite rendering processor 2 performs a drawing process that stores pattern data of the sprite in the display memory 3 according to the attribute data 3 stored in the sprite attribute table 1A for drawing. On the other hand, the CPU writes attribute data 4 to the sprite attribute table 1B for update. In parallel with these operations, in frame 4, image data that is stored in the display memory 3 in frame 3, i.e., pattern data of the sprite drawn according to the attribute data 2, is read from the display memory 3 and displayed on the display.

As described above, the attribute data used for drawing of the sprite is switched in the order of attribute data 1→attribute data 2→attribute data 3→attribute data 4. The displayed form of the sprite is changed in this manner to display an animation.

However, the conventional image display device described above has a problem in that CPU load for animation display is increased since the CPU must frequently write attribute data to each sprite attribute table in order to perform animation display.

SUMMARY OF THE INVENTION

The invention has been made in view of the above circumstances and it is an object of the invention to provide an image display device that can perform animation display without putting high load on the CPU.

The invention provides an image display device comprising: a display memory that stores image data to be displayed on a display; a sprite attribute table that stores attribute data representing a display attribute of a sprite which is a component of the image data; a sprite rendering processor that executes a drawing process for reflecting image data of the sprite to the image data stored in the display memory according to the attribute data stored in the sprite attribute table; and an animation execution engine that reads an animation execution program including both attribute data to be transferred and a table write command of the attribute data from an external memory, and that executes the animation execution program to transfer the attribute data to the sprite attribute table according to the table write command.

According to the invention, the animation execution engine reads, from an external memory, an animation execution program including a table write command according to an instruction from a CPU and executes the program to transfer the attribute data to a sprite attribute table at the timing of execution of the table write command. Accordingly, it is possible to perform animation display without putting large load on the CPU.

In the invention, the animation execution engine is provided for rewriting of the sprite attribute table separately from CPU, thereby reducing working load of CPU. In case that there are a plurality of sprites to be animated, it is desirable that the CPU operates to rewrite and update attribute data of a part of the sprites and the animation execution engine rewrite and update attribute data of the remaining part of the sprites. In such a case, it is necessary to synchronize animation display of sprites which are updated by the CPU and animation display of sprites which are updated by the animation execution engine with each other.

Thus, the invention provides another image display device comprising: a display memory that stores image data to be displayed on a display; a sprite attribute storage that stores attribute data representing a display attribute of a sprite which is a component of the image data; a sprite rendering processor that executes a drawing process for reflecting image data of the sprite to the image data stored in the display memory according to the attribute data of the sprite stored in the sprite attribute storage; and an animation execution engine that reads an animation execution program from an external memory and that executes the animation execution program including a command to rewrite the attribute data of the sprite stored in the sprite attribute storage, wherein, in addition to the animation execution engine, a CPU is able to rewrite attribute data in the sprite attribute storage, and wherein, when a specific command is fetched as a command constituting a part of the animation execution program, the animation execution engine executes the specific command on a condition that at least a synchronous signal is received from the CPU.

According to the invention, the CPU rewrites the attribute data of sprite stored in the sprite attribute storage for displaying animation on the display and at the same time the animation execution engine rewrites the attribute data of other sprite stored in the sprite attribute storage for displaying animation on the display. In this case, the CPU controls output timing of synchronization signals for controlling execution timing of sequential commands by the animation execution engine. Therefore, the animation display performed under the control by the animation execution engine can be synchronized with the animation display performed under the control by CPU.

BRIEF DESCRIPTION OF THE DRAWINGS

FIG. 2 illustrates configurations of various commands included in the animation execution program in the embodiment.

DETAILED DESCRIPTION OF THE INVENTION

Embodiments of the invention will now be described with reference to the drawings.

Figure 1:
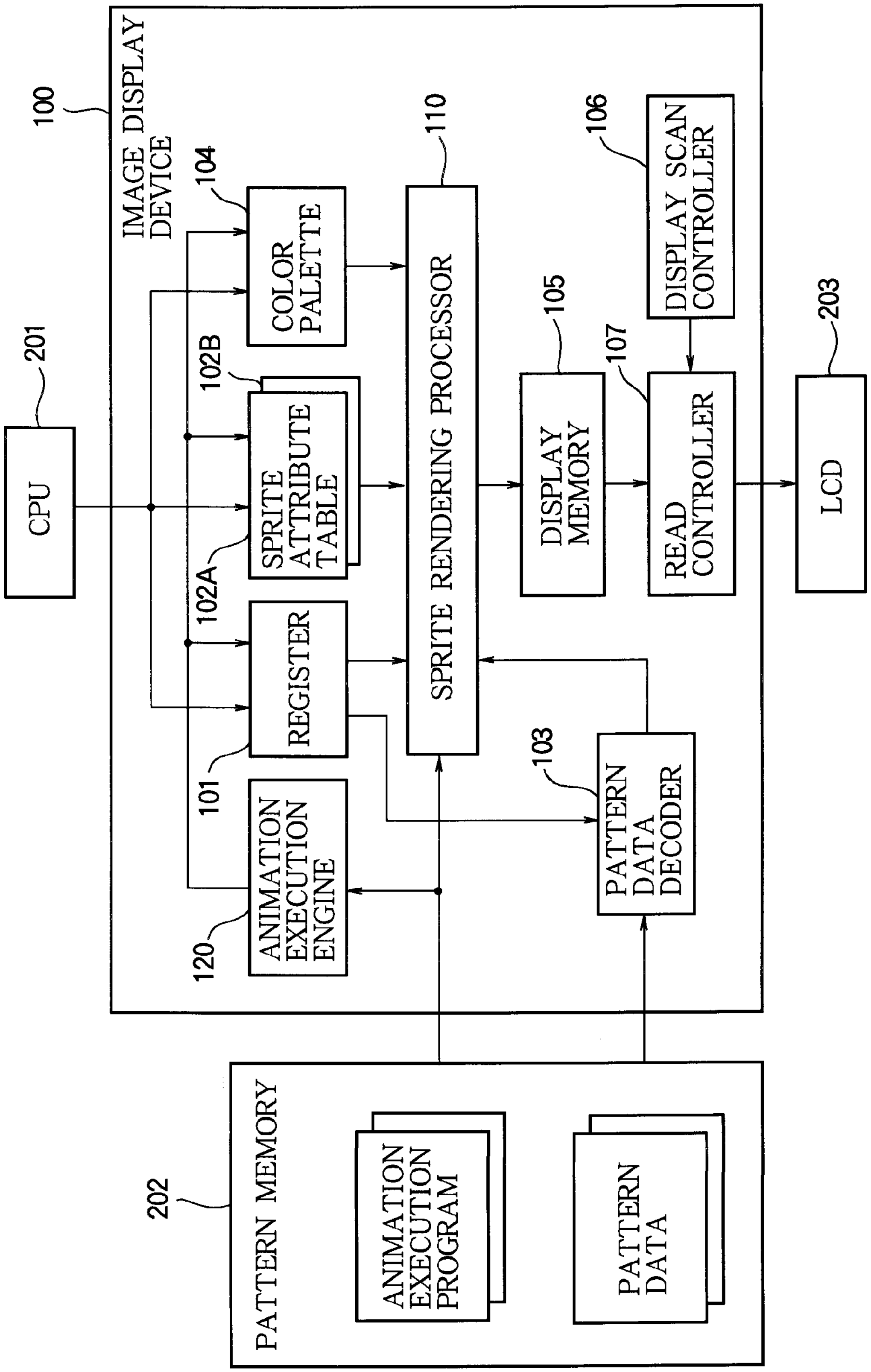
FIG. 1 is a block diagram illustrating a configuration of an image display device according to an embodiment of the invention.

FIG. 1 is a block diagram illustrating a configuration of an image display device 100 according to an embodiment of the invention. This image display device 100 is a device that reads pattern data of a sprite from a pattern memory 202, which is an external memory such as a Read Only Memory (ROM), according to an instruction from a CPU 201, generates image data to be displayed, and displays the image data on a Liquid Crystal Display (LCD). Not only compressed sprite pattern data but also a program to execute an animation are stored in the pattern memory 202. This animation execution program is a group of commands to perform a variety of controls for animation display.

A configuration of the image display device 100 is described as follows. A register 101 is a means that stores control information used to control each part of the image display device 100. In this embodiment, both the CPU 201 and an animation execution engine 120 installed in the image display device 100 perform writing of control information to the register 101.

Each of sprite attribute tables 102A and 102B is a sprite attribute storage that stores attribute data representing a display attribute(s) of each sprite which is to be displayed and is constructed using, for example, a Random Access Memory (RAM). The sprite attribute tables 102A and 102B may be implemented through individual RAMS and may also be implemented through different areas of a common RAM. The sprite rendering processor 110 is a processor that performs a drawing process according to attribute data of the sprite stored in the sprite attribute tables 102A and 102B. Details of the drawing process will be described later. The animation execution engine 120 is a means that executes an animation execution program in the pattern memory 202 and performs rewriting of attribute data of the sprite attribute tables 102A and 102B or the like.

In this embodiment, both the CPU 201 and the animation execution engine 120 perform rewriting of attribute data of the sprite attribute tables 102A and 102B. More specifically, each of the sprite attribute tables 102A and 102B of this embodiment is divided into a CPU control area in which rewriting of attribute data is performed by the CPU 201 and a program control area in which rewriting of attribute data is performed by the animation execution engine 120 based on the animation execution program. In this embodiment, switching control is performed on the CPU control areas of the sprite attribute tables 102A and 102B such that one of the CPU control areas of the sprite attribute tables 102A and 102B is switched to an area for drawing that is referenced in the drawing process when the other is switched to an area for update to which attribute data is to be rewritten. In addition, switching control is also performed on the program control areas of the sprite attribute tables 102A and 102B, independent of the CPU control areas, such that one of the program control areas of the sprite attribute tables 102A and 102B is switched to an area for drawing that is referenced in the drawing process when the other is switched to an area for update to which attribute data is to be rewritten.

A pattern data decoder 103 is a device that reads and decodes pattern data of a sprite which is to be displayed from the pattern memory 202 and outputs image data representing respective colors of pixels constituting the sprite.

In the case where the image data of the sprite to be displayed includes color codes representing the colors of the pixels of the sprite, a color palette 104 is used as a conversion table for converting the image data into image data representing the intensities of color components of pixels such as R, G, and B or Y, U, and V that can be used for display. The color palette 104 is constructed of a RAM or the like. In this embodiment, the CPU 201 and the animation execution engine 120 can update the contents of the color palette 104.

A display memory 105 is a memory that stores image data for display on an LCD 203. The display memory 105 may be a frame memory that stores image data in units of frames and may also be a line memory that stores image data in units of lines.

Every vertical scan period of the LCD 203, the sprite rendering processor 110 performs a drawing process which reflects, applies or introduces the image data of the sprite to the display memory 105 according to attribute data in a CPU control area and a program control area which are areas for drawing among the CPU control areas and the program control areas of the sprite attribute tables 102A and 102B. Namely, the sprite rendering processor 110 renders a pattern of the sprite on the display. More specifically, at the end time of a vertical blank period of one vertical scan period, the sprite rendering processor 110 detects a CPU control area and a program control area which are areas for drawing among the CPU control areas and the program control areas of the sprite attribute tables 102A and 102B, and allows the pattern data decoder 103 to decode pattern data of the sprite represented by the attribute data in the areas for drawing, and stores the image data of the sprite obtained by the pattern data decoder 103 in the display memory 105. Here, in the case where the image data of the sprite obtained by the pattern data decoder 103 is represented by color codes, the sprite rendering processor 110 allows the color palette 104 to convert the image data into image data of an RGB format, a YUV format, or the like. When the image data of each sprite is stored in the display memory 105, the sprite rendering processor 110 performs control associated with storage address, storage timing, or the like of the image data in the display memory 105 according to display attributes such as a display position of the sprite represented by the attribute data in the areas for drawing.

A display scan controller 106 is a circuit that generates a synchronous signal for display control of the LCD 203 such as a vertical synchronous signal VSYNC_N and a horizontal synchronous signal HSYNC_N and provides the synchronous signals to the LCD 203 and a read controller 107. The read controller 107 reads image data from the display memory 105 according to the synchronous signal output from the display scan controller 106 and provides the read image data to the LCD 203.

The manner of writing image data (for drawing) to the display memory 105 by the sprite rendering processor 110 and the manner of reading image data from the display memory 105 by the read controller 107 in the case where the display memory 105 is a flash memory are different from those in the case where the display memory 105 is a line memory.

In the former case, for example, two frame memories are used for the display memory 105. In each vertical scan period, one of the two frame memories is a memory for drawing and the other is a memory for display and, each time vertical scan periods are switched, the frame memory for drawing is switched to one for display and the frame memory for display is switched to one for drawing. In each vertical scan period, the sprite rendering processor 110 writes image data of one frame to the frame memory for drawing, and the read controller 107 reads image data from the frame memory for display and provides the read image data to the LCD 203.

In the latter case, for example, two line memories corresponding to two lines are used for the display memory 105. In each horizontal scan period, one of the two line memories is a memory for drawing and the other is a memory for display and, each time horizontal scan periods are switched, the line memory for drawing is switched to one for display and the line memory for display is switched to one for drawing. In each horizontal scan period, the sprite rendering processor 110 writes image data of one line to the line memory for drawing and, in synchronization with the horizontal synchronous signal HSYNC_N, the read controller 107 reads image data from the line memory for display and provides the read image data to the LCD 203.

The animation execution engine 120 reads and executes the animation execution program from the pattern memory 202 according to an instruction received from the CPU 201 through the register 101. The animation execution engine 120 then performs writing of attribute data to the area for update while performing control to switch each of the program control areas of the sprite attribute tables 102A and 102B between an area for update and an area for drawing.

FIG. 2 illustrates configurations of various commands included in the animation execution program in this embodiment. Each command, excluding an end command, includes a one-byte opcode and an operand of one or more bytes. As shown in FIG. 2, the entry of an opcode for each command includes a character that the opcode represents in the ASCII code system. For example, the opcode of a start command represents a character "S" in the ASCII code system.

The start command is located at the beginning of the animation execution program and contains the number of loops as an operand. When the animation execution program includes a loop section, the number of loops indicates the number of times the animation execution program returns to the start of the loop section from the end thereof, i.e., indicates a number which is one less than the number of repetitions of the loop section. The end command is located at the end of the animation execution program and includes an opcode alone.

The loop command specifies the loop section and is located at a position corresponding to the end of the loop section in the animation execution program. The loop command contains a return address and a repetition mode value as operands. Here, the return address is data indicating the number of addresses by which the start of the loop section precedes an address (of the end of the loop section) at which the loop command is stored. The repetition mode value specifies the number of times that the animation execution program returns from the end to the start of the loop section. The repetition mode value may have one of two values of "0" and "1". The repetition mode value "0" indicates that the animation execution program returns to the start of the loop section the same number of times as the number of loops which is an operand of the start command. The repetition mode value "1" indicates that the operation for returning to the start of the loop section is repeated infinitely, regardless of the number of loops as an operand of the start command.

An interval command is a command to instruct a waiting operation. This interval command includes an operand for specifying the number of vertical blank periods for waiting, i.e., the number of end points of the vertical blank periods for waiting. When this interval command has been executed, the animation execution engine 120 awaits generation of the same number of vertical blank periods as the number of vertical blank periods for waiting indicated by the operand, and executes a subsequent command when the last vertical blank period is terminated. This interval command is useful, for example, as a means for adjusting the timing of execution of a table write command.

A flip command instructs performance of control to allow image data of a sprite stored in the sprite attribute tables 102A and 102B to be used in a drawing process. More specifically, the flip command is a command to instruct execution of a flip operation for switching each of the program control areas of the sprite attribute tables 102A and 102B between an area for update and an area for drawing, and includes a flip mode value as an essential operand and a layer start address LYSAM and a layer end address LYEAM as optional operands.

The flip mode value is an operand for specifying the type of a flip operation and includes an execution condition flag CSY, an address rewrite flag LYA, and table switch control data LYBSEL. Here, the execution condition flag CSY is a flag for specifying a condition for execution of the flip command. When a flip command having an execution condition flag CSY of "0" has been fetched, the animation execution engine 120 immediately executes the flip command. A flip command having an execution condition flag CSY of "1" is a conditional command having a condition for execution such that it is executed on the condition that at least a synchronous signal is received from the CPU 201. When a flip command having an execution condition flag CSY of "1" has been fetched, the animation execution engine 120 waits until an enable signal EN is received as a synchronous signal from the CPU 201 and executes the flip command at the start time of a vertical blank period subsequent to reception of the enable signal EN.

The address rewrite flag LYA is a flag indicating whether or not to rewrite a layer start address LYSAM representing the start point of the program control area corresponding to the animation execution program in each of the sprite attribute tables 102A and 102B and a layer end address LYEAM representing the end point of the program control area. The address rewrite flag LYA is "0" when rewriting of the layer start address LYSAM and the layer end address LYEAM is not performed and is "1" when rewriting thereof is performed.

The table switch control data LYBSEL is 2-bit data indicating whether to switch each of the program control areas of the sprite attribute tables 102A and 102B to an area for drawing or to an area for update. More specifically, a flip command of LYBSEL=1Xb, where "b" denotes binary unit and "X" denotes negation, instructs switching of a program control area, which is an area for update among the program control areas of the sprite attribute tables 102A and 102B, to an area for drawing and to switch a program control area, which is an area for drawing among the program control areas of the sprite attribute tables 102A and 102B, to an area for update. A flip command of LYBSEL=00b, where b is binary and X is negation, instructs switching of the program control area of the sprite attribute table 102A to an area for drawing and switching of the program control area of the sprite attribute table 102B to an area for update. A flip command of LYBSEL=01b instructs switching of the program control area of the sprite attribute table 102B to an area for drawing and an instruction to switch the program control area of the sprite attribute table 102A to an area for update.

The layer start address LYSAM and the layer end address LYEAM are operands added to a flip command when LYA="1". When a flip command of LYA=1 is executed, start and end addresses of the program control area are changed to the layer start address LYSAM and the layer end address LYEAM specified by the operands.

In this embodiment, the effects of the execution of the flip command are produced at the end time of a vertical blank period subsequent to the timing of execution of the flip command. That is, when a flip command of LYBSEL=1Xb is executed, a program control area which has been served as an area for update until the flip command is executed is switched to an area for drawing and a program control area which has been served as an area for drawing is switched to an area for update at the end time of a vertical blank period subsequent to the timing of execution of the flip command from among the respective end times of vertical blank periods of vertical scan periods.

The table write command is a command to instruct writing of data specified by one operand of the table write command to an area which is specified by another operand thereof in a program control area that is an area for update among the program control areas of the sprite attribute tables 102A and 102B. The table write command includes, as operands, the number of bytes for writing to the program control area which is an area for update, a write start address (a relative address in the sprite attribute table) which is the start position of an area to which data is to be written in the program control area which is an area for update, and data for writing of the same number of bytes as the number of bytes for writing described above.

A table cycle write command is a command to instruct repeated writing of data specified by one operand of the table cycle write command to an area which is specified by another operand thereof in a program control area that is an area for update among the program control areas of the sprite attribute tables 102A and 102B. The table cycle write command includes, as operands, the number of bytes for repeated writing to the program control area which is an area for update, a write start address which is the start position of an area to which data is to be written in the program control area which is an area for update, a write end address which is the end position of the area, and data for writing of the same number of bytes as the number of bytes for repeated writing described above.

This table cycle write command is used to initialize the sprite attribute tables 102A and 102B. In this embodiment, the sprite attribute tables 102A and 102B have a data length of 12 bytes long per address. Accordingly, the entire area of the sprite attribute tables 102A and 102B can be initialized by repeatedly executing a table cycle write command whose data for writing is 12-byte initialization data. Initialization of the sprite attribute tables 102A and 102B is performed upon animation switching or the like.

A palette write command is a command to instruct writing of data specified by one operand of the palette write command to an area which is specified by another operand thereof in the color palette 104. The palette write command includes, as operands, the number of bytes for writing to the color palette 104, a write start address which is the start position of an area to which data is to be written in the color palette 104, and data for writing of the same number of bytes as the number of bytes for writing described above.

A register write command is a command to instruct writing of data specified by one operand of the register write command to an area which is specified by another operand thereof in the register 101. The register write command includes, as operands, the number of bytes for writing to the register 101, a write start address which is the start position of an area to which data is to be written in the register 101, and data for writing of the same number of bytes as the number of bytes for writing described above.

The configurations of the commands which constitute the animation execution program have been described above. The animation execution engine 120 has a function to analyze and execute each of the commands.

In this embodiment, the animation execution engine 120 can execute a plurality of animation execution programs in parallel through time division control. The register 101 includes the same number of execution control information storage areas as the number of animation execution programs that can be executed in parallel by the animation execution engine 120. Each of the execution control information storage areas stores a storage start address of an animation execution program to be executed in the pattern memory 202 and three types of execution control flags PLAY, PAUSE, and STOP.

Execution of one animation execution program is controlled in the following manner. First, when flags PLAY, PAUSE, and STOP of an execution control information storage area are set to “1”, “0”, and “0”, respectively, the animation execution engine 120 starts, through the CPU 201, execution of an animation execution program in an area which starts from a storage start address stored in the execution control information storage area in the pattern memory 202.

The animation execution engine 120 temporarily stops executing the animation execution program when the execution control flags PLAY, PAUSE, and STOP in the execution control information storage area have changed from “1”, “0”, and “0” to “0”, “1”, and “0”, respectively.

The animation execution engine 120 resumes executing the animation execution program from the address, at which it was temporarily stopped, when the execution control flags PLAY, PAUSE, and STOP in the execution control information storage area have returned from “0”, “1”, and “0” to “1”, “0”, and “0”, respectively.

The animation execution engine 120 terminates executing the animation execution program in the area which starts from the storage start address stored in the execution control information storage area in the pattern memory 202 when the execution control flags PLAY, PAUSE, and STOP in the execution control information storage area have been set into “0”, “0”, and “1”, respectively.

Although the manner of control of execution of one animation execution program has been described above, control of execution of a plurality of animation execution programs in parallel is performed in the same manner.

An execution control information storage area corresponding to each animation execution program stores not only the information described above but also a layer start address LYSAM and a layer end address LYEAM indicating a range of program control areas corresponding to the animation execution program in the sprite attribute tables 102A and 102B. An execution control information storage area corresponding to each animation execution program also stores a table status flag LYBSELM indicating which of the program control areas corresponding to the animation execution program in the sprite attribute tables 102A and 102B is an area for drawing and which of the program control areas is an area for update.

When a table status flag LYBSELM in an execution control information storage area corresponding to an animation execution program is “0”, a program control area in the sprite attribute table 102A among program control areas of the sprite attribute tables 102A and 102B corresponding to the animation execution program is an area for drawing and a program control area in the sprite attribute table 102B is an area for update. On the other hand, when the table status flag LYBSELM is “1”, the program control area in the sprite attribute table 102B is an area for drawing and the program control area in the sprite attribute table 102A is an area for update.

The animation execution engine 120 rewrites a table status flag LYBSELM in an execution control information storage area corresponding to each animation execution program according to a flip command in the animation execution program. Similarly, the animation execution engine 120 also rewrites the layer start address LYSAM and the layer end address LYEAM indicating the range of program control areas corresponding to the animation execution program according to the flip command in the animation execution program.

In addition to execution control information storage areas corresponding respectively to animation execution programs described above, the register 101 includes an execution control information storage area that stores control information for controlling execution of animation display through the CPU 201. The execution control information storage area for animation display through the CPU 201 stores a table status flag LYBSELC indicating which of the CPU control areas of the sprite attribute tables 102A and 102B is an area for drawing and which of the CPU control areas is an area for update. When the table status flag LYBSELC is “0”, the CPU control area of the sprite attribute table 102A is an area for drawing and the CPU control area of the sprite attribute table 102B is an area for update. On the other hand, when the table status flag LYBSELC is “1”, the CPU control area of the sprite attribute table 102B is an area for drawing and the CPU control area of the sprite attribute table 102A is an area for update. The animation execution engine 120 rewrites the value of the table status flag LYBSELC based on both the vertical synchronous signal VSYNC_N output by the display scan controller 106 and the enable signal EN that the CPU 201 outputs after writing the attribute data to the CPU control area for update. More specifically, the animation execution engine 120 reverses the table status flag LYBSELC at a reference time having a predetermined phase relative to a start point of a vertical scan period subsequent to reception of the enable signal EN, specifically, at the end time of a vertical blank period of the vertical scan period. This switching of the table status flag LYBSELC may also be performed by a device other than the animation execution engine 120.

Figure 3:
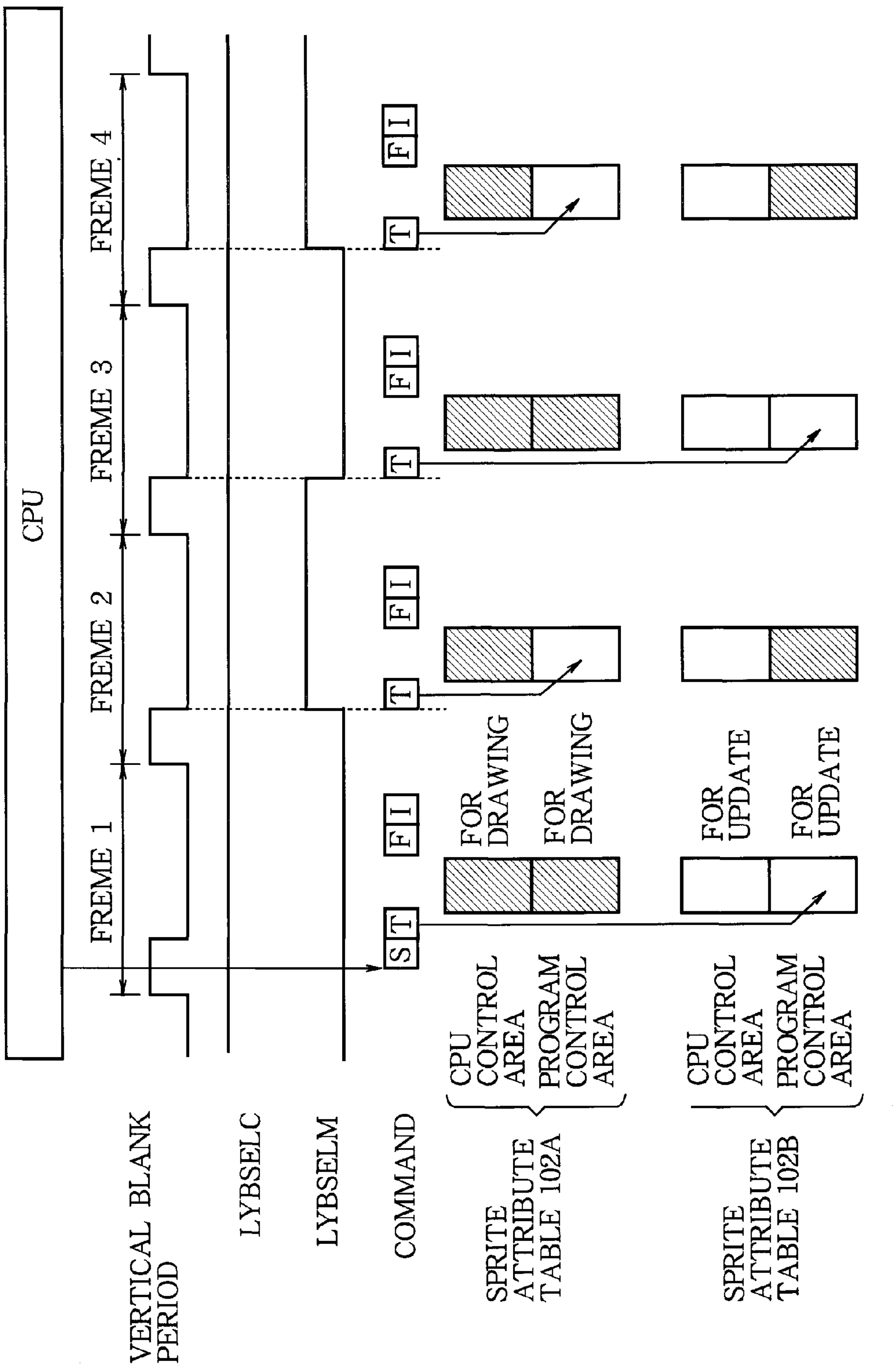
FIG. 3 is a time chart illustrating a first example operation of the embodiment.

FIG. 3 is a time chart illustrating a first example operation of this embodiment. In FIG. 3, “S” denotes a start command, “T” denotes a table write command, “F” denotes a flip command, and “I” denotes an interval command. Flags CSY, LYA, and LYBSEL of every flip command F are “0”, “0”, and “1Xb”, respectively, (i.e., CSY=0, LYA=0, LYBSEL=1Xb). In the first example operation, attribute data of each of the CPU control areas of the sprite attribute tables 102A and 102B is not rewritten. Accordingly, the CPU 201 does not output the enable signal EN and the table status flag LYBSELC is maintained at “0”. In the first example operation, only the animation execution engine 120 rewrites attribute data of each of the program control areas of the sprite attribute tables 102A and 102B and performs animation display on the LCD 203.

In the first example operation, in frame 1, the CPU 201 writes execution control flags of PLAY=“1”, PAUSE=“0”, and STOP=“0” to an execution control information storage area corresponding to an animation execution program in the register 101. In frame 1, the animation execution engine 120 starts executing the animation execution program specified by a storage start address in the execution control information storage area among animation execution programs in the pattern memory 202.

First, the animation execution engine 120 executes a start command S which is a first command of the animation execution program. Then, the animation execution engine 120 executes a table write command T as a second command. In this example, at this time, a table status flag LYBSELM in the execution control information storage area corresponding to the animation execution program is “0”, the program control area of the sprite attribute table 102A is an area for drawing, and the program control area of the sprite attribute table 102B is an area for update. Therefore, the animation execution engine 120 transfers data (data for writing) specified by one operand of the table write command T to an area specified by another operand (write start address) thereof in the program control area of the sprite attribute table 102B. Then, the animation execution engine 120 fetches a flip command F which is a third command. The animation execution engine 120 immediately executes the flip command F since the flip command F has a CSY of 0. However, the effects of execution of the flip command F are not produced at this time but instead are produced at the end time of a next vertical blank period.

Then, the animation execution engine 120 executes an interval command I which is a fourth command. In this example, the number of vertical blank periods for waiting indicated by an operand of the interval command I is “1”. Therefore, the animation execution engine 120 awaits execution of a fifth command until a vertical blank period in frame 2 is terminated.

When the vertical blank period of frame 2 is terminated, the effects of execution of the flip command F are produced. That is, the table status flag LYBSELM in the execution control information storage area corresponding to the animation execution program is reversed from “0” to “1”, the program control area of the sprite attribute table 102A is switched to an area for update, and the program control area of the sprite attribute table 102B is switched to an area for drawing. As a result, the attribute data, which was written to the program control area (which was an area for update in frame 1) of the sprite attribute table 102B through the table write command T in frame 1, is used for a drawing process in a display period subsequent to the vertical blank period of frame 2. In addition, when the vertical blank period of frame 2 is terminated, the animation execution engine 120 executes a table write command T which is the fifth command since a condition regarding the number of vertical blank periods for waiting specified by the operand of the interval command I which is the fourth command is satisfied. In this case, the animation execution engine 120 transfers data (data for writing) specified by one operand of the table write command T to an area specified by another operand (write start address) thereof in the program control area of the sprite attribute table 102B. Then, the animation execution engine 120 fetches and immediately executes a flip command F which is a sixth command. Also in this case, the effects of execution of the flip command F are not produced at this time but instead are produced at the end time of a vertical blank period of the next frame 3.

Then, the animation execution engine 120 executes an interval command I which is a seventh command. In this example, the number of vertical blank periods for waiting indicated by an operand of the interval command I is “1”. Therefore, the animation execution engine 120 awaits execution of an eighth command until a vertical blank period in frame 3 is terminated.

Similarly, in this illustrated example, a table write command T, a flip command F, and an interval command I, which are the eighth to tenth commands, are sequentially executed in frame 3 and then the interval command I causes the animation execution engine 120 to await execution of the next 11th command until a vertical blank period of frame 4 is terminated. Then, a table write command T, a flip command F, and an interval command I, which are the 11th to 13th commands, are sequentially executed in frame 4.

As described above, in the example illustrated in FIG. 3, attribute data is transferred to a program control area for update among the program control areas of the sprite attribute tables 102A and 102B in each frame according to each command included in the animation execution program, and a display attribute such as a display position of the sprite is updated and also the table status flag LYBSELM is reversed, i.e., an area for update is switched to an area for drawing and an area for drawing is switched to an area for update. On the other hand, in each frame, the sprite rendering processor 110 performs drawing of the sprite on the display memory 105 according to attribute data in a program control area which is an area for drawing among the program control areas of the sprite attribute tables 102A and 102B. Thus, according to this embodiment, it is possible to allow the LCD 203 to perform animation display without putting load on the CPU 201.

In addition, according to this embodiment, since it is possible to use an interval command in the animation execution program, it is possible to adjust the timing of execution of the table write command T (more specifically, the interval of execution of the table write command T described above) using the interval command I and the table write command T in combination, and it is also possible to achieve synchronization with the vertical scan period. Accordingly, it is also possible to easily control the timing of movement of the sprite in the animation.

Further, in the example illustrated in FIG. 3, since the number of vertical blank periods for waiting which is an operand of each interval command I is “1”, a table write command T is executed in each frame to transfer attribute data to a program control area for update among the program control areas of the sprite attribute tables 102A and 102B. However, when the number of vertical blank periods for waiting which is an operand of each interval command I is, for example, “2”, a table write command T is executed once in two frames to transfer attribute data to a program control area for update among the program control areas of the sprite attribute tables 102A and 102B. Thus, according to this embodiment, it is possible to adjust the frame rate which determines the speed of movement of the sprite by adjusting the number of vertical blank periods for waiting which is an operand of each interval command I.

Furthermore, in this embodiment, the animation execution program can use a flip command F of CSY=0, LYA=0, and LYBSEL=1Xb and a table write command T in combination as shown in FIG. 3. In this manner, it is possible to immediately switch a sprite attribute table for update, in which attribute data has been updated through execution of the table write command T, to a sprite attribute table for drawing and to allow the sprite rendering processor 110 to perform drawing using the updated attribute data.

Moreover, in this embodiment, a loop command can be used in the animation execution program although it is not used in the animation execution program in the example shown in FIG. 3. In the case where the loop command is used, it is possible to allow the animation execution engine 120 to repeatedly execute commands in a loop section in the animation execution program and to display, for example, an animation including periodic movement of a sprite without increasing the total number of bytes of the animation execution program.

In addition, a palette write command can be used in the animation execution program although it is not used in the animation execution program in the example shown in FIG. 3. In the case where the palette write command is used, it is possible to perform, for example, effects such as display color change on the sprite at an arbitrary time during animation without imposing load on the CPU 201.

Figure 4:
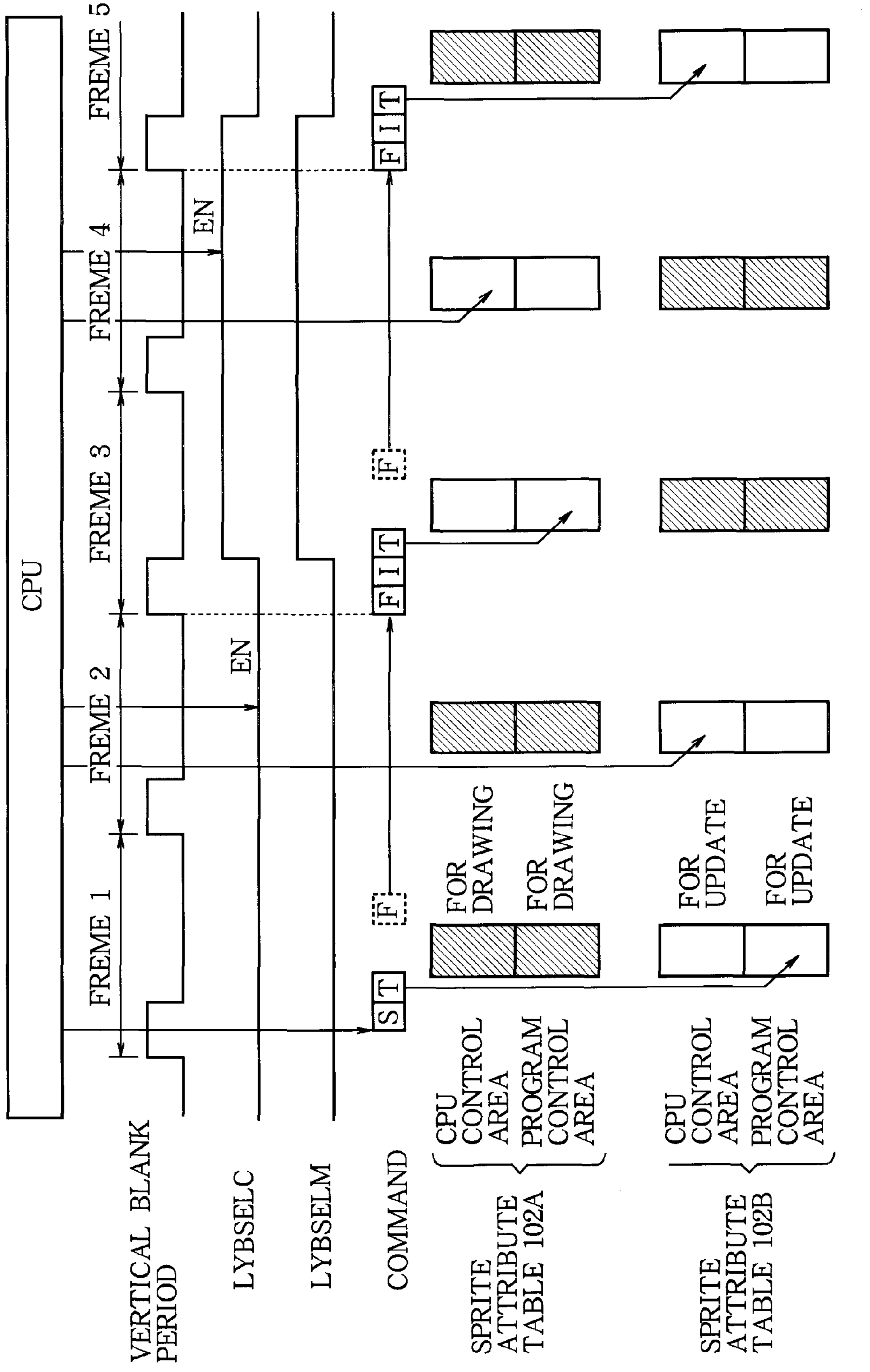
FIG. 4 is a time chart illustrating a second example operation of the embodiment.
Figure 5:
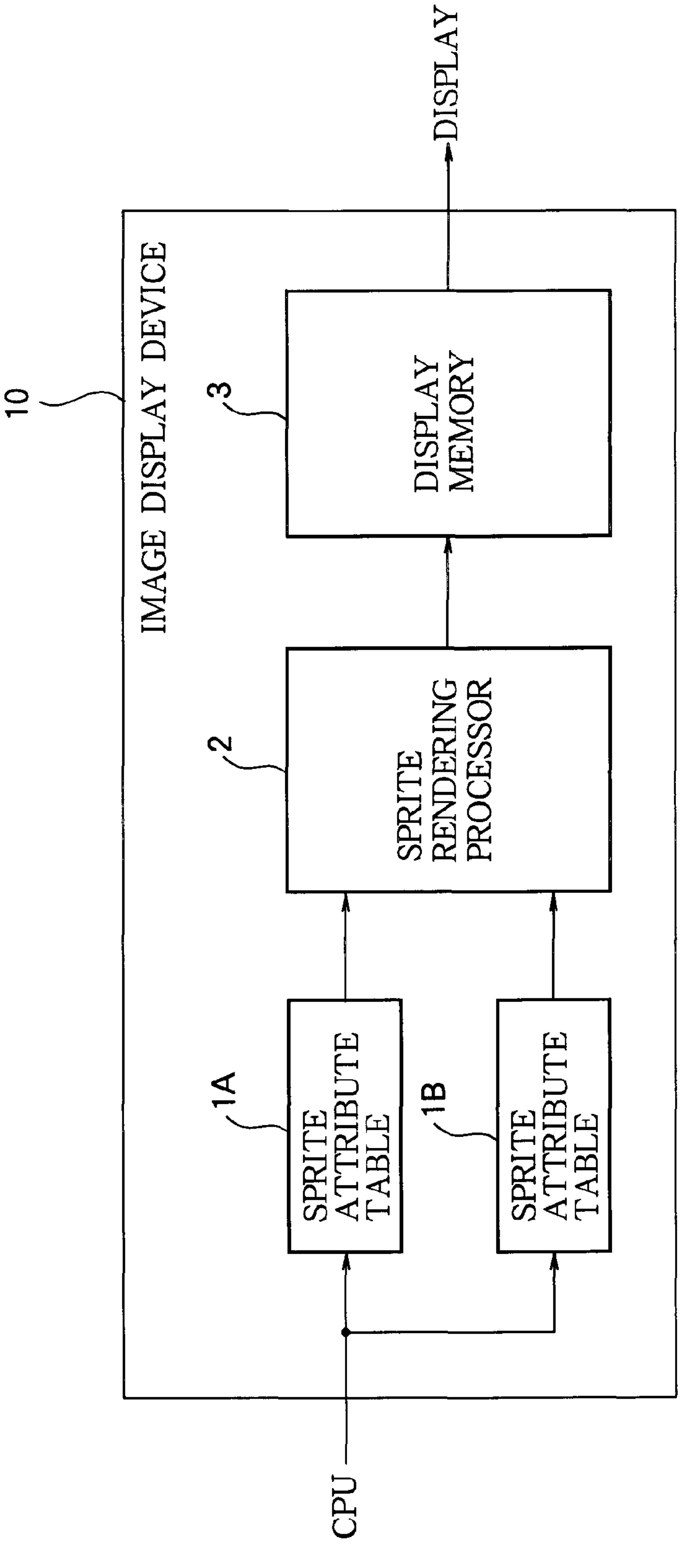
FIG.5 (Prior Art)
FIG. 5 is a block diagram illustrating a configuration of part of a conventional image display device.
Figure 6:
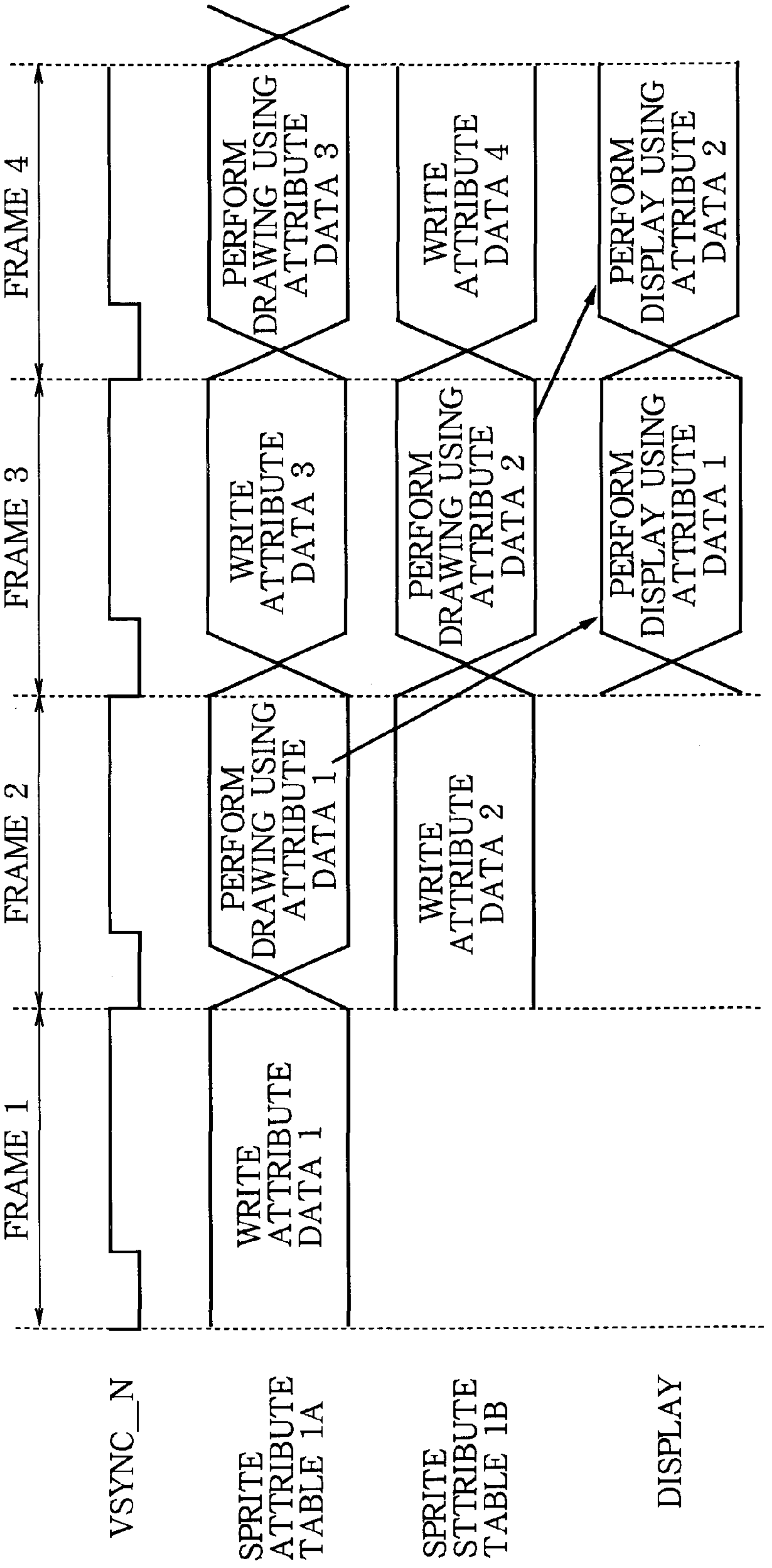
FIG.6 (Prior Art)
FIG. 6 is a time chart illustrating an example of the operation of the conventional image display device for performing animation display.

FIG. 4 is a time chart illustrating a second example operation of this embodiment. In the second example operation, flags CSY, LYA, and LYBSEL of every flip command F are “1”, “0”, and “1Xb”, respectively, (i.e., CSY=1, LYA=0, and LYBSEL=1Xb). In the second example operation, the CPU 201 rewrites attribute data of each of the CPU control areas of the sprite attribute tables 102A and 102B. The CPU 201 also outputs an enable signal EN each time transmission of attribute data to a CPU area for update among the CPU control areas of the sprite attribute tables 102A and 102B is terminated. The effects of output of the enable signal EN are produced at a reference time having a predetermined phase relative to a start point of a vertical scan period after the enable signal EN is output, specifically, at the end time of a first vertical blank period after the enable signal EN is output. That is, when the enable signal EN has been output, the table status flag LYBSELC is reversed at a first end time after the enable signal EN is output from among the end times of vertical blank periods of frames. In the second example operation, the animation execution engine 120 performs rewriting of attribute data of each of the program control areas of the sprite attribute tables 102A and 102B in parallel with rewriting of attribute data in each of the CPU control areas through the CPU 201.

Similar to the first example operation described above, in frame 1, the CPU 201 writes execution control flags PLAY=1, PAUSE=0, and STOP=0 to an execution control information storage area corresponding to an animation execution program in the register 101 and activates the animation execution program.

A start command S, which is a first command, and a table write command T, which is a second command, are executed in the same manner as in the first example operation. That is, in frame 1, the animation execution engine 120 executes the first start command S and then executes the second table write command T and writes attribute data corresponding to a first screen of the animation to the program control area of the sprite attribute table 102B which is an area for update at that time. Then, the animation execution engine 120 fetches a flip command F which is a third command. The flip command F is a conditional command having a condition for execution which includes an execution condition flag CSY of "1". Therefore, the animation execution engine 120 waits until the CPU 201 outputs an enable signal EN without immediately executing the flip command F.

On the other hand, in frame 1, the CPU 201 writes attribute data corresponding to the first screen of the animation to the CPU control area after the CPU 201 instructs start of execution of the animation execution program. In this example, since the table status flag LYBSELC is initially "0", attribute data corresponding to the first screen output from the CPU 201 is written to the CPU control area of the sprite attribute table 102B. Then, upon termination of writing of the attribute data corresponding to the first screen to the CPU control area of the sprite attribute table 102B, the CPU 201 outputs an enable signal EN in frame 2.

When the enable signal EN has been output in frame 2 in the above manner, the animation execution engine 120 executes the flip command F, execution of which has been awaited, at the start time of a vertical blank period of frame 3. The effects of execution of the flip command F are produced at the end time of the same vertical blank period. After terminating execution of the flip command F, the animation execution engine 120 executes an interval command I which is a fourth command in the same vertical blank period. In this example, the number of vertical blank periods for waiting indicated by an operand of the interval command I is "1". Therefore, the animation execution engine 120 awaits execution of a fifth command until the ongoing vertical blank period in frame 3 is terminated.

When the vertical blank period of frame 3 is terminated, the effects of output of the enable signal EN performed in frame 2 are produced. That is, the table status flag LYBSELC is reversed from "0" to "1". Accordingly, the CPU control area of the sprite attribute table 102A is switched to an area for update and the CPU control area of the sprite attribute table 102B is switched to an area for drawing. As a result, the attribute data corresponding to the first screen, which is written to the CPU control area of the sprite attribute table 102B (which is written to an area for update in frame 1 and written to an area for drawing in the display period in frame 3) by the CPU 201, is used for a drawing process in a display period subsequent to the vertical blank period of frame 3.

In addition, when the vertical blank period of frame 3 is terminated, the effects of execution of the flip command F are produced. That is, the table status flag LYBSELM in the execution control information storage area corresponding to the running animation execution program is reversed from "0" to "1". Accordingly, the program control area of the sprite attribute table 102A is switched to an area for update, and the program control area of the sprite attribute table 102B is switched to an area for drawing. As a result, the attribute data corresponding to the first screen, which is written to the program control area of the sprite attribute table 102B (which is written to an area for update in frame 1 and written to an area for drawing in the display period in frame 3) according to the table write command T in frame 1 is used for a drawing process in a display period subsequent to the vertical blank period of frame 3.

As described above, in this embodiment, switching can be performed between the CPU control area for update and the CPU control area for drawing at the end time of a vertical blank period subsequent to the timing of output of the enable signal EN by the CPU 201 and, simultaneously with this switching, switching can be performed between the program control area for update and the program control area for drawing according to a flip command having a condition for execution. Accordingly, even if the time when the animation execution engine 120 writes the attribute data corresponding to the first screen to the program control area according to the animation execution program is different from the time when the CPU 201 writes the attribute data corresponding to the first screen to the CPU control area, the attribute data corresponding to the first screen written by the animation execution program and the attribute data corresponding to the first screen written by the CPU 201 are used for a drawing process in the same frame and both animation display by the CPU 201 and animation display by the animation execution program are initiated at the same time.

When the vertical blank period of frame 3 is terminated, the animation execution engine 120 executes the table write command T which is the fifth command since a condition regarding the number of vertical blank periods for waiting specified by an operand of the interval command I which is the fourth command is satisfied. At this time, the table status flag LYBSELM is "1", the program control area of the sprite attribute table 102A is an area for update, and the program control area of the sprite attribute table 102B is an area for drawing. Therefore, the animation execution engine 120 transfers data (data for writing) specified by one operand of the table write command T to an area specified by another operand (write start address) thereof in the program control area of the sprite attribute table 102A.

Then, the animation execution engine 120 fetches a flip command F which is a sixth command. The flip command F is a command having a condition for execution which includes an execution condition flag CSY of "1". Therefore, the animation execution engine 120 waits until the CPU 201 outputs an enable signal EN without immediately executing the flip command F.

On the other hand, the CPU 201 writes attribute data corresponding to the second screen of the animation to the CPU control area of the sprite attribute table 102A which is an area for update. Then, upon termination of writing of the attribute data, the CPU 201 outputs an enable signal EN in frame 4.

When the enable signal EN has been output in frame 4 in the above manner, the animation execution engine 120 executes the flip command F, execution of which has been awaited, at the start time of a vertical blank period of frame 5. The effects of execution of the flip command F are produced at the end time of the same vertical blank period. After terminating execution of the flip command F, the animation execution engine 120 executes an interval command I which is a seventh command in the same vertical blank period. In this example, the number of vertical blank periods for waiting indicated by an operand of the interval command I is "1". Therefore, the animation execution engine 120 awaits execution of an eighth command until the ongoing vertical blank period in frame 5 is terminated.

When the vertical blank period of frame 5 is terminated, the effects of output of the enable signal EN occurring in frame 4 are produced. That is, the table status flag LYBSELC is reversed from "1" to "0". Accordingly, the CPU control area of the sprite attribute table 102B is switched to an area for update and the CPU control area of the sprite attribute table 102A is switched to an area for drawing. As a result, the attribute data corresponding to the second screen, which is written to the CPU control area of the sprite attribute table 102A (which is written to an area for update in frame 4 and written to an area for drawing in the display period in frame 5) by the CPU 201, is used for a drawing process in a display period subsequent to the vertical blank period of frame 5.

In addition, when the vertical blank period of frame 5 is terminated, the effects of execution of the flip command F are produced. That is, the table status flag LYBSELM in the execution control information storage area corresponding to the running animation execution program is reversed from "1" to "0". Accordingly, the program control area of the sprite attribute table 102B is switched to an area for update, and the program control area of the sprite attribute table 102A is switched to an area for drawing. As a result, the attribute data corresponding to the second screen, which is written to the program control area of the sprite attribute table 102A (which is written to an area for update in frame 3 and written to an area for drawing in the display period in frame 5) according to the table write command T in frame 3 is used for a drawing process in a display period subsequent to the vertical blank period of frame 5.

Similarly, in this embodiment, each time the CPU 201 writes attribute data corresponding to each of the third, fourth, . . . screens to the CPU control area and outputs an enable signal EN, the CPU control area for drawing and the CPU control area for update are switched and, simultaneously with this switching, the program control area for drawing and the program control area for update are switched to each other. Accordingly, at the same time as when attribute data corresponding to each of the third, fourth, . . . screens output by the CPU 201 is used for a drawing process, attribute data corresponding to each of the third, fourth, . . . screens written to the program control area by the animation execution program is used for the drawing process. Thus, according to this embodiment, synchronization between animation display by the CPU 201 and animation display by the animation execution program is achieved even after animation display is initiated.

In the second example operation described above, the frame rate of animation display is determined by the frequency of output of an enable signal EN by the CPU 201. In the example illustrated in FIG. 4, animation screens are switched at a rate of once per 2 frames since the CPU 201 outputs an enable signal EN at a rate of once per 2 frames. The frequency of output of an enable signal EN by the CPU 201 may be increased when there is a need to increase the frame rate of animation and may be decreased when there is a need to decrease the frame rate of animation.

In addition, although only one type of animation execution program is executed in the example illustrated in FIG. 4, it is possible in this embodiment to allow the animation execution engine 120 to execute a plurality of types of animation execution programs simultaneously through time division control in parallel with update of attribute data of the CPU control area by the CPU 201. Here, each animation execution program independently performs control to switch one of the program control areas, corresponding to the animation execution program, of the sprite attribute tables 102A and 102B to an area for drawing and vice versa to switch the other to an area for update.

Accordingly, for example, a first animation execution program which uses a flip command having a condition for execution (i.e., having a CSY of "1") and a second animation execution program which uses a flip command having no condition for execution (i.e., having a CSY of "0") can be executed in parallel through the animation execution engine 120. In this case, the first animation execution program executes the flip command having a condition for execution after waiting until the CPU 201 outputs an enable signal EN and the second animation execution program immediately executes the flip command having no condition for execution without waiting until the CPU 201 outputs an enable signal EN. Accordingly, animation display by the first animation execution program which is in synchronization with animation display by the CPU 201 can also be performed synchronously with animation display by the second animation execution program which is not in synchronization with animation display by the CPU 201.

Other Embodiments

Although the invention has been described with reference to the above embodiment, the invention may also employ various other embodiments. The following are examples.

(1) In the above embodiment, two sprite attribute tables 102A and 102B are provided and one of the sprite attribute tables 102A and 102B is used as a sprite attribute table for update to perform updating of attribute data while the other is used as a sprite attribute table for drawing in a drawing process. For example, regarding the program control areas, one of the program control areas of the sprite attribute table 102A and 102B is used as an area for update to rewrite the attribute data while the other program control area is used as an area for drawing in the drawing process. However, when a constraint that drawing be performed only in a specific section of a vertical scan period is set, update of attribute data may be performed using another section of the vertical scan period. Thus, only one sprite attribute table may be provided in this embodiment.

(2) Although the animation execution program has a configuration in which a table write command includes data to be transferred as an operand in the above embodiment, the invention may also employ a configuration in which data to be transferred of each table write command is located in a specific region in the animation execution program. In this embodiment, in the case where the animation execution program includes a plurality of table write commands instructing transmission of attribute data having the same content, the attribute data to be transferred may be shared between the table write commands to reduce the total amount of data of the animation execution program.

(3) In the above embodiment, both the animation execution engine 120 and the CPU 201 write attribute data to the sprite attribute tables 102A and 102B and cause the LCD 203 to perform animation display. However, the invention may employ an embodiment wherein only the animation execution engine 120 writes attribute data to the sprite attribute tables 102A and 102B and causes the LCD 203 to perform animation display. In this embodiment, there is no need to divide each of the sprite attribute tables 102A and 102B into a CPU control area and a program control area.

(4) In the above disclosed embodiments, the flip command is made conditional. Other commands than the flip command may be made conditional. For example, there may be provided a NOP command which does nothing, and the NOP command may be made conditional.

What is claimed is:

1. An image display device comprising:

a display memory that stores image data to be displayed on a display;

a sprite attribute storage that stores attribute data representing a display attribute of a sprite which is a component of the image data;

a sprite rendering processor that executes a drawing process for reflecting image data of the sprite to the image data stored in the display memory according to the attribute data of the sprite stored in the sprite attribute storage; and an animation execution engine that reads an animation execution program from an external memory and that executes the animation execution program including a command to rewrite the attribute data of the sprite stored in the sprite attribute storage, wherein, in addition to the animation execution engine, a CPU is able to rewrite attribute data in the sprite attribute storage, and wherein, when a specific command is fetched as a command constituting a part of the animation execution program, the animation execution engine executes the specific command on a condition that at least a synchronous signal is received from the CPU.

2. The image display device according to claim 1, wherein the specific command is a command to instruct control for allowing the attribute data of the sprite stored in the sprite attribute storage to be used in the drawing process.

3. The image display device according to claim 2, wherein:

the sprite attribute storage comprises first and second sprite attribute tables, each storing attribute data of a sprite, each of the first and second sprite attribute tables is divided into a CPU control area in which rewriting of attribute data is performed by the CPU and a program control area in which rewriting of attribute data is performed by the animation execution engine based on the animation execution program, and the respective CPU control areas of the first and second sprite attribute tables are subjected to switching control such that one of the CPU control areas is switched to an area for update to be subjected to attribute data rewriting when the other of the CPU control areas is switched to an area for drawing to be referenced in the drawing process and, independently of the CPU control areas, the respective program control areas of the first and second sprite attribute tables are subjected to switching control such that one of the program control areas is switched to an area for update to be subjected to attribute data rewriting when the other of the program control areas is switched to an area for drawing to be referenced in the drawing process, the sprite rendering processor performs a drawing process for reflecting image data of a sprite to the image data in the display memory according to attribute data stored in an area for drawing among the CPU control areas and the program control areas of the first and second sprite attribute tables, according to the animation execution program, the animation execution engine performs control to switch each of the program control areas of the first and second sprite attribute tables between an area for update and an area for drawing while performing rewriting of attribute data in the area for update, and when a conditional flip command has been fetched as the specific command, the animation execution engine performs control to switch each of the program control areas of the first and second sprite attribute tables between an area for update and an area for drawing after waiting until an enable signal is received as the synchronous signal from the CPU.

4. The image display device according to claim 3, wherein:

at a reference timing having a predetermined phase relative to a start point of a vertical scan period of the display after the enable signal is received from the CPU, switching control is performed to switch each of the respective CPU control areas of the first and second sprite attribute tables between an area for drawing and an area for update, and when the conditional flip command has been fetched, the animation execution engine performs switching control to switch each of the respective program control areas of the first and second sprite attribute tables between an area for drawing and an area for update at the reference timing after the enable signal is received from the CPU.

* * * * *